Figure 1:
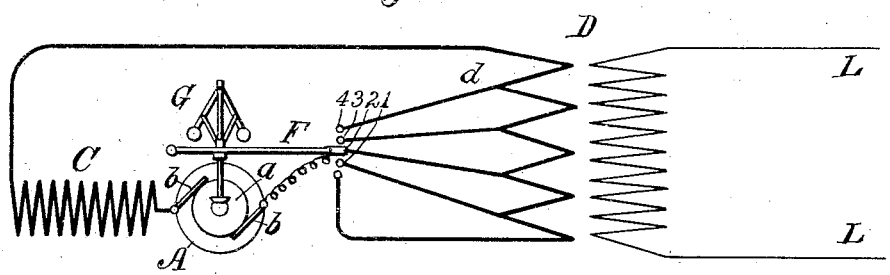

No. 745,325. PATENTED DEC. 1, 1903.
A. J. CHURCHWARD.
ALTERNATING CURRENT MOTOR.
APPLICATION FILED MAR. 29, 1897.
NO MODEL. 2 SHEETS—SHEET 1.

WITNESSES:
C. L. Belcher
Hn H. Capel

INVENTOR
Alexander J. Churchward,
BY
J. C. Townsend
HIS ATTORNEY

No. 745,325. PATENTED DEC. 1, 1903.
A. J. CHURCHWARD.
ALTERNATING CURRENT MOTOR.
APPLICATION FILED MAR. 29, 1897.
NO MODEL. 2 SHEETS—SHEET 2.

WITNESSES:
C. L. Belcher
Wm. H. Capel

INVENTOR
Alexander J. Churchward,
BY
J. C. Townsend
HIS ATTORNEY.

No. 745,325.

Patented December 1, 1903.

UNITED STATES PATENT OFFICE.

ALEXANDER J. CHURCHWARD, OF BROOKLYN, NEW YORK.

ALTERNATING-CURRENT MOTOR.

SPECIFICATION forming part of Letters Patent No. 745,325, dated December 1, 1903.

Application filed March 29, 1897. Serial No. 629,852. (No model.)

*To all whom it may concern:*

Be it known that I, ALEXANDER J. CHURCHWARD, a citizen of the United States, and a resident of Brooklyn, in the county of Kings and State of New York, have invented a certain new and useful Alternating-Current Motor, of which the following is a specification.

My invention relates to alternating-current electric motors generally, but is particularly useful with those which by proper organization and arrangement of circuits are self-starting under the influence of a single-phase alternating current.

The general object of the invention is to provide for the efficient operation and the ready control of such motors.

The invention is designed especially for use with motors which have any usual direct-current armature-winding and commutator and may be operated by feeding alternating currents to the commutator and field simultaneously, the field-coils being preferably in series with the armature. As is well known, such machines will start from rest and will accelerate and finally reach a synchronous speed, but are not self-regulating and will run away under light load. Moreover, such machines as hitherto constructed and operated have been very inefficient because of the large losses necessarily present in the machine, owing to the construction adopted in order that the machine may have sufficient starting torque and which remains as a source of loss after the machine has been brought up to the normal running speed.

My invention consists, essentially, in the combination, with the machine, of a transformer supplying alternating currents thereto and suitably wound to permit its voltage to be regulated, as hereinafter described, through the medium of suitable switch devices that serve to throw in windings of the transformer to give an excess voltage at starting and afterward to throw out said windings and thereafter control the speed by preferably throwing out windings of the transformer and reducing the voltage supplied thereby when the speed rises above the normal or desired working speed and throwing in windings and increasing the voltage when the speed falls below such normal speed. The switch devices may be worked by hand or may be controlled by speed-responsive devices which act in accord with the speed of the armature. A suitable device for the purpose is a centrifugal governor.

When a motor having a direct-current armature and commutator is operated by a single-phase current and run in synchronism with the alternating-current supply, the armature becomes in effect a constant field excited by the direct current flowing in the armature-coils. The poles of the field-magnet will alternate rapidly and will act practically as a revolving field to rotate the armature. Operated under this condition there is no appreciable loss by hysteresis in the armature or by self-induction in its wires, and if this condition may be preserved the machine may be operated with high efficiency. My present invention permits this to be accomplished by varying the winding of the transformer which supplies the current to the machine, so as to increase the voltage if the speed falls below the synchronous speed and to decrease it if the speed rises above such speed.

By the term "synchronous speed" I mean to include any other speed which is a multiple or submultiple of said speed, since if, for instance, the machine be run at half-speed the losses will only be due to half the reversals of the line. For example, if synchronous speed is eighteen hundred in a four-pole machine and the frequency seven thousand two hundred with half-speed the losses will only be due to three thousand six hundred alternations or at quarter-speed to eighteen hundred alternations.

Figure 2:
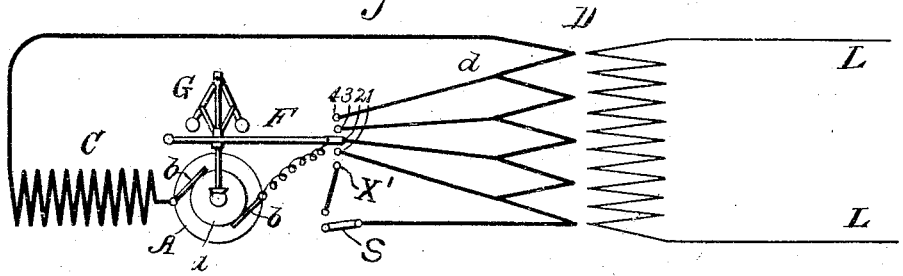

In the accompanying drawings, Figures 1 and 2 illustrate my invention diagrammatically. Figs. 3, 4, 5, and 6 show a form of motor and regulating mechanism by which the invention may be practiced.

In the drawings I have shown the invention as carried out in connection with a four-pole machine, the armature A of which is wound like any direct or continuous current generator or motor and is provided with the usual commutator, the cylinder of which is indicated at $a$ and the brushes at $b$, disposed about said cylinder in the usual manner. The four-field magnet-poles are shown at $c$, and the field-magnet coils at C. By suitable connections the field-coils are in series with the armature, as indicated in the diagram, or are otherwise connected to the supply-circuits, so that alternating currents will flow to said coils in step with or at the same frequency with the alternating currents fed to the commutator-brushes and through the commutator-cylinder to the armature.

By preference I organize and operate the motor as a series motor—that is, with the armature and field coils in series with one another—and this is the condition of the machine both during starting or acceleration and when running at normal speed.

D typifies any transformer which supplies alternating currents to the motor, as indicated in the diagrams, and which has a sectional winding permitting the voltage of said currents to be regulated or varied, as will be presently described.

Preferably the secondary or local d is sectionally wound for this purpose. The primary is supplied with current from mains or wires L L of any suitable electrical condition, as well understood in the art. A switch typified at F moves over a set of contacts numbered 1, 2, 3, 4 and connected to the sections of coil d to permit the number of the same to be varied in obvious manner, so as to increase or diminish the voltage of the alternating currents supplied to commutator-brushes b and field C.

When the speed falls from the desired synchronous or other predetermined speed, the switch is turned to increase the number of coils d in action, and thus increase the impressed electromotive force, and when the speed rises above the predetermined or synchronous speed the switch is turned in the opposite direction to decrease the number of coils d and lower the impressed electromotive force. When the machine is running at less than the full synchronous speed or in the starting operation, the alternating current flows as an alternating current in both armature and field in series with one another, but when the synchronous speed is reached the current flows as a continuous or direct current in said armature and as an alternating current in the field, but said field and armature are in series, as before. By suitable adjustment of the switches the armature may be kept at the synchronous speed. If desired, the machine may be kept at a lower than synchronous speed in the same manner—as, for instance, at half-speed or quarter-speed—by proper adjustment of the regulating devices and will then work at high efficiency.

The switch or other regulator may be operated by hand or automatically by any device responsive to differences of speed—as, for instance, by a centrifugal governor typified at G, that may be connected with the switch or other device in any suitable way. A suitable construction of governor and switch is shown in Figs. 3, 4, and 6 and will be presently described.

The operation of the devices so far as described would be as follows: At starting or at low speed the switch would be on contact 1. The motor would then be supplied with all of the voltage due to all the coils d between contact 1 and the opposite end of coils d, connected to the field C. The high self-induction of the motor at starting would be compensated for by the large voltage thus supplied. As the motor increases in speed the switch would be turned, decreasing the voltage of the applied current until the synchronous speed is reached, at which time the switch rests on a contact such that the voltage would keep the motor running at that speed. On further increase of speed the switch would further decrease the voltage, and the motor will drop back to the synchronous or other predetermined speed. When the motor is at rest and current is turned on, there are eddy-current losses, self-induction, and losses due to hysteresis, which all tend to reduce the useful voltage of the line by increasing the self-induction of the motor, so that if the motor has to have a large starting torque the self-induction will be too great to pass sufficient current to give the necessary torque. To allow an excess of current to flow when starting the motor, I provide some auxiliary means in connection therewith for permitting or furnishing such excess current, and thereby avoid the necessity hitherto existing of using a motor which in order to get the desired starting torque has been made unnecessarily larger or has been so constructed that when running at speed it will be inefficient. Such auxiliary means may be extra turns in the transformer, so that if the machine is wound to run on, say, one hundred volts we can momentarily get two hundred volts. The centrifugal governor or other suitable means may be used to cut out such extra turns. These extra turns are shown connected to an auxiliary contact X' either directly or through a hand-switch S.

Figure 3:
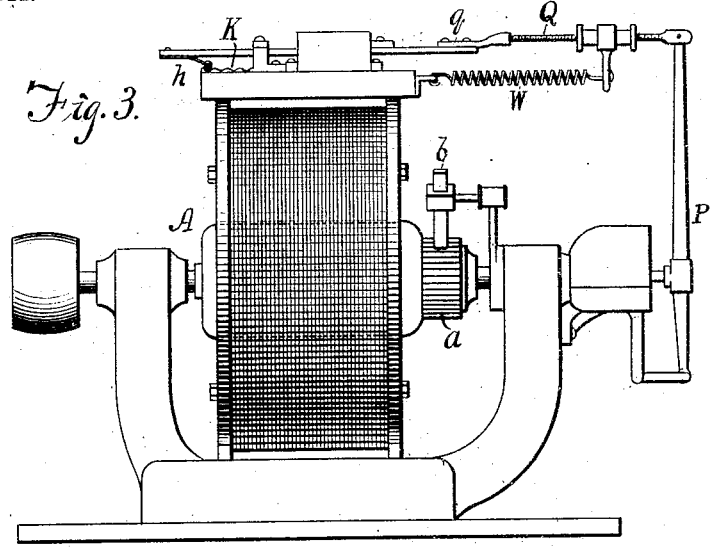
Figure 4:
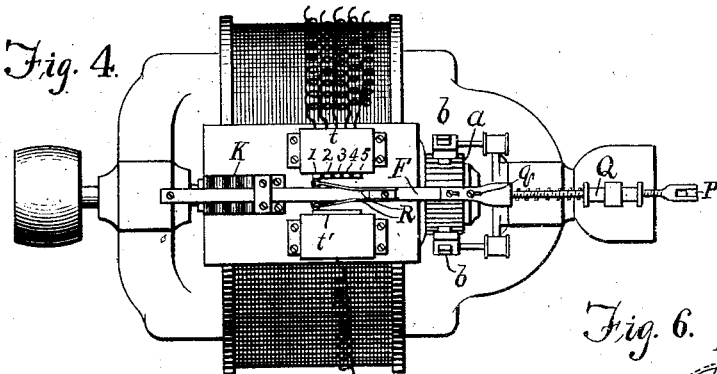
Figure 6:
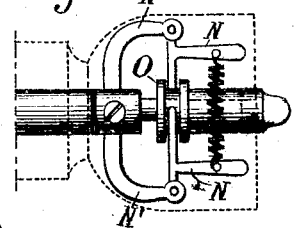
Figure 5:
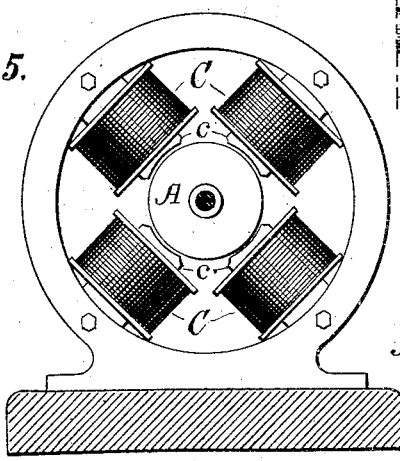

A suitable mechanical construction of centrifugal governor and a preferred construction of controlling-switch are illustrated more in detail in Figs. 3, 4, and 6. The governor-balls are secured to the ends of the elbow-levers N, mounted in a bracket N', connected to the motor-shaft. The outward radial movement of the balls is resisted by a spring connecting them. The levers engage in a groove in a sleeve O, movable axially on the shaft and acting against a lever P, which is connected to a rod Q, carrying the switch-contact, composed in this case of a pair of springs R R, attached to the rod and in electrical union with one another. This contact slides in the space between the series of contact-blocks t, insulated from one another in a suitable box or holder and a continuous plate or block t', mounted in a box at the opposite side of the track of the contact R R. The sections of coil or circuits to be controlled are connected to the contacts t, and the opposite pole of the circuits to t', and the contact R R of the switch thus formed will in obvious manner as it moves to and fro under the action of the governor cut the coil-sections into and out of circuit. A retractor-spring W acts on the switch-bar Q to help reverse its movement when the speed falls.

To obviate sparking as the switch-contact rides over the series of contacts, it should under ordinary conditions of use momentarily bridge successive contacts—that is, make contact with a succeeding before leaving a previous contact. This means a momentary short-circuiting of adjoining contacts which introduces a serious difficulty when the set of coils connected to the series of contacts carries an alternating current. This difficulty arises from the fact that the section of coil short-circuited will bear the relation to others in circuit at the time of a secondary of a transformer and heavy currents will be generated in it which, if long continued, will damage the switch-contacts and will give rise to a damaging arc at the instant of break of contact. To obviate this difficulty, I provide means for giving the switch a snap action as it passes from each contact of the series to another in both directions of adjustment. This snap action may be provided by a bar K, having a series of projections or teeth and intermediate spaces over which rides a spring-actuated catch or detent in the form preferably of a friction-roller $h$, carried by a spring attached to the switch-rod Q. At $q$ in the rod Q or any other suitable point in the connections there is interposed a lost motion by means of a pin-and-slot connection, as indicated, to permit the switch to move freely under the operation of the spring-actuated catch or detent as the latter slips into each intermediate space between projections on bar K in obvious manner after having been forced over the summit of one of said projections. The parts are properly arranged, so that this quick or snap action will cause the contact to snap from each contact-point to the next.

As will be obvious, the form of bar K and detent $h$, as well as the form and manner of application of the spring which forces the detent into the depressions, and thereby causes the longitudinal movement of the switch-bar Q, may be largely varied. It is also obvious that either the bar K or the detent might be attached to the rod Q and the other be fixed in position on a suitable support.

What I claim as my invention is—

1. A single-phase self-starting alternating-current motor, having an armature provided with a continuous or direct current winding and commutator, and operated by alternating current fed to the armature through said commutator, a transformer having a variable number of coils supplying said armature, as described, and supplying the field direct, and means for varying the number of coils in action, as described, so as to decrease the voltage when the speed rises above and increase it when the speed falls below a predetermined speed.

2. A self-starting single-phase alternating-current motor, operated at synchronous speed by alternating current fed direct to its field and to a continuous or direct current armature-winding through the commutator therefor, in combination with a transformer having a variable winding supplying said alternating currents, and means for automatically varying the number of coils in action according to the speed, as and for the purpose described.

3. A single-phase alternating-current motor operated by alternating currents fed to the commutator of a direct or continuous current armature-winding, in combination with a transformer supplying said currents, and means, such as a centrifugal governor responsive to differences in speed of the armature for connecting and disconnecting transformer-coils so as to keep the motor at a synchronous or predetermined speed.

4. The combination with an alternating-current motor, of a transformer supplying alternating current thereto and having a sectional winding, a switch controlling said winding, and means for automatically operating said switch from the motor so as to vary the impressed electromotive force upon the motor-terminals according to the torque or speed desired.

5. The combination with an alternating-current motor, of a sectional transformer supplying alternating current thereto, and means responsive to variations in the speed of the machine for varying the electromotive force supplied by said transformer to keep the speed constant.

6. The combination with an alternating-current motor, of a transformer supplying said motor and suitably wound to provide an excess of voltage for starting, and a switch for controlling the windings of said transformer; whereby after starting normal voltage may be supplied thereby to the motor while running at speed.

7. The combination with an alternating-current motor, of a transformer supplying current thereto and wound to give an extra voltage at starting, means for cutting out the extra voltage-windings after speed is attained, an automatic speed-regulator operating on the windings of said transformer to keep the speed constant, as and for the purpose described.

8. The combination with a series-wound motor having a direct-current armature-winding and commutator, a transformer supplying alternating currents thereto and adapted to furnish an excess voltage for starting, a sectional winding for said transformer, and means for cutting out the winding by which the motor is brought up to speed, and for automatically varying the winding after speed is attained so as to keep the same constant.

9. The combination with an alternating-current motor, of an alternating-current source for supplying current thereto, and means operated by the motor for automatically varying the electromotive force of said alternating-current source in such a manner as to decrease the said electromotive force as the speed of the motor increases and to increase the said electromotive force as the speed of the motor decreases.

Signed at New York, in the county of New York and State of New York, this 20th day of February, A. D. 1897.

ALEXANDER J. CHURCHWARD.

Witnesses:
WM. H. CAPEL,
D. H. DECKER.